(12) United States Patent
Van Rooyen et al.

(10) Patent No.: US 9,595,034 B2
(45) Date of Patent: Mar. 14, 2017

(54) SYSTEM AND METHOD FOR MONITORING THIRD PARTY ACCESS TO A RESTRICTED ITEM

(71) Applicant: Stellenbosch University, Stellenbosch (ZA)

(72) Inventors: Gert-Jan Van Rooyen, Somerset West (ZA); Frederick Johannes Lutz, Stellenbosch (ZA); Herman Arnold Engelbrecht, Somerset West (ZA)

(73) Assignee: STELLENBOSCH UNIVERSITY, Stellenbosch (ZA)

( * ) Notice: Subject to any disclaimer, the term of this patent is extended or adjusted under 35 U.S.C. 154(b) by 78 days.

(21) Appl. No.: 14/285,567

(22) Filed: May 22, 2014

(65) Prior Publication Data

US 2015/0120567 A1 Apr. 30, 2015

Related U.S. Application Data

(63) Continuation of application No. 14/179,347, filed on Feb. 12, 2014, now abandoned.

(30) Foreign Application Priority Data

Oct. 25, 2013 (ZA) ................................. 2013/08093

(51) Int. Cl.
*G06Q 20/38* (2012.01)
*G06Q 20/06* (2012.01)
(Continued)

(52) U.S. Cl.
CPC ......... *G06Q 20/3829* (2013.01); *G06F 21/00* (2013.01); *G06F 21/10* (2013.01); *G06Q 20/065* (2013.01); *H04L 2463/101* (2013.01)

(58) Field of Classification Search
None
See application file for complete search history.

(56) References Cited

U.S. PATENT DOCUMENTS

2001/0051996 A1* 12/2001 Cooper et al. ................ 709/217
2004/0005078 A1   1/2004 Tillotson
(Continued)

FOREIGN PATENT DOCUMENTS

| WO | 98/45768 A1 | 10/1998 |
| WO | 2009/046373 A1 | 4/2009 |
| WO | 2012/162739 A1 | 12/2012 |

OTHER PUBLICATIONS

Nakamoto, Satoshi, "Bitcoin: A Peer-to-Peer Electronic Cash System," Oct. 31, 2008. Retrieved from the Internet <URL: https://bitcoin.pdf.> The whole document.

*Primary Examiner* — John Hayes
*Assistant Examiner* — Jason Fenstermacher
(74) *Attorney, Agent, or Firm* — Fenwick & West LLP

(57) ABSTRACT

A system and method for monitoring third party access to a restricted item is provided. Key data is embedded in the restricted item, the key data being associated with a store of value and usable to conduct a transaction against the store of value. A record of the transaction becomes visible in a transaction ledger. The transaction ledger is monitored to determine whether a transaction against the store of value has occurred, and the restricted item is designated as accessed by a third party in the event that a transaction against the store of value has occurred.

23 Claims, 8 Drawing Sheets

(51) Int. Cl.
*G06F 21/00* (2013.01)
*G06F 21/10* (2013.01)

(56) References Cited

U.S. PATENT DOCUMENTS

2008/0130058 A1    6/2008  Cheng
2009/0316950 A1*  12/2009  Alasia et al. ................. 382/100
2014/0164251 A1*  6/2014  Loh ................................ 705/67

* cited by examiner

SYSTEM AND METHOD FOR MONITORING THIRD PARTY ACCESS TO A RESTRICTED ITEM

FIELD OF THE INVENTION

This invention relates to a system and method for monitoring third party access to a restricted item.

BACKGROUND TO THE INVENTION

Numerous technologies and management strategies are employed by owners, distributors and providers of restricted items to control the distribution, access to and use of such restricted items, particularly in cases where property rights, copyright or other rights subsist in such items. Many of these technologies and strategies are directed at controlling the distribution, access to and use of restricted media items.

Licensing agreements are a well-known method of managing rights to media items. Such agreements typically require a consumer to enter into an agreement restricting the consumer from redistributing media or content.

Various technologies have been devised to aid owners, distributors and providers of media in preventing unauthorized redistribution of content or deterring consumers from attempting such redistribution. For example, in the case of computer software, copy protection may be provided which allows a consumer to install the software on a limited number of computers using a unique code which grants access to the software.

In addition to preventing or deterring content reproduction and redistribution, some technologies aim to prevent, among other things, the accessing, printing or altering of media. A notable example is the use of web-based permission schemes to prevent unauthorized access to media.

A notable problem associated with these and other existing media rights management technologies and strategies is that it may be difficult to determine at or near which point in time the restricted item was first distributed, accessed or used illegitimately or without appropriate authorization. In some cases, at the time when the illegitimate activities first become known to a responsible party, the restricted item may have already been made available to numerous individuals or entities.

Additionally, there may be no immediate penalty or punishment imposed on a consumer who does, for example, unlawfully redistribute media. In many cases, the redistributed media becomes available to others to such an extent that tracing an infringing entity may become difficult or impracticable. In cases where the infringing entity can be traced, finding and taking action against the entity may be a drawn out process requiring considerable legal and administrative costs to be incurred.

Therefore, known techniques and strategies may not sufficiently deter attempts to redistribute or provide access to restricted items unlawfully or without appropriate authorization. Furthermore, existing media rights management systems may adversely impact legitimate consumers. For example, fair usage of media may be restricted by preventing an entity authorized to possess media from moving the media from one personal device to another personal device, or by preventing the entity from editing certain media items.

Embodiments of the present invention aim to address these and other problems, at least to some extent.

SUMMARY OF THE INVENTION

In accordance with the invention there is provided a method of monitoring third party access to a restricted item comprising the steps of:

embedding key data in the restricted item, the key data being associated with a store of value and usable to conduct a transaction against the store of value, wherein a record of the transaction becomes visible in a transaction ledger;

monitoring the transaction ledger to determine whether a transaction against the store of value has occurred; and designating the restricted item as accessed by a third party in the event that a transaction against the store of value has occurred.

Further features of the invention provide for the method to include the steps of: storing, in a database, the key data or data derived at least partially therefrom in association with an entity credential of an authorized entity, the authorized entity authorized to possess the restricted item; if the restricted item is designated as accessed by a third party, identifying the authorized entity as a responsible party to be held accountable for the third party access; and, in response to determining that a transaction against the store of value has occurred, updating the database to indicate that the key data or data derived at least partially therefrom associated with the entity credential was used to conduct a transaction against the store of value.

Yet further features of the invention provide for the store of value to have a balance of digital currency; for the transaction ledger to be a shared public ledger containing records of transactions conducted using the digital currency; for the digital currency to be a cryptocurrency; for the store of value to be a cryptocurrency address; and for the cryptocurrency address to be represented by or derived at least partially from a cryptocurrency public key corresponding to a cryptocurrency private key.

Still further features of the invention provide for the key data to include the cryptocurrency private key or an address identifier derived at least partially from the cryptocurrency private key; for conducting a transaction against the store of value to include using at least the cryptocurrency private key to perform a cryptocurrency transaction; and for performing the cryptocurrency transaction to include transferring at least some of a balance of cryptocurrency held at the cryptocurrency address to a second, receiving cryptocurrency address represented by or derived at least partially from a second, receiving cryptocurrency public key.

A further feature of the invention provides for one or more of the cryptocurrency private key, the address identifier and the cryptocurrency public key to be associated with an authorized entity authorized to possess the restricted item and to be stored, in a database, in association with an entity credential of the authorized entity, wherein if the restricted item is designated as accessed by a third party, the authorized entity is identified as the responsible party to be held accountable for the third party access.

Further features of the invention provide for the key data to be readable from the restricted item by any third party that accesses the restricted item either directly or using a software tool; and for the step of embedding key data in the restricted item to include embedding a plurality of sets of key data in the restricted item.

Yet further features of the invention provide for the plurality of sets of key data to provide progressive levels of key data, wherein different software tools are required to access each of the progressive levels or to read the key data from each of the progressive levels; and for a software tool required to access a particular level of key data or to read the key data from the particular level to be made publicly available once it becomes known that techniques are available for removing the key data of a previous level from the restricted item.

Still further features of the invention provide for the cryptocurrency address to be controlled or managed by a party capable of monitoring the shared public ledger to determine whether a transaction against the store of value has occurred; and for the party controlling or managing the cryptocurrency address to be selected from the group consisting of: an individual having ownership or control of the restricted item, a group having ownership or control of the restricted item, an authorized entity authorized to possess the restricted item, a restricted item provider from which one or more authorized entity has requested the restricted item, and a third party associated with the restricted item provider.

Further features of the invention provide for the restricted item to be a media item; and for the media item to be a digital or analogue media item selected from the group consisting of: one or more video files, streaming media, one or more image files, one or more audio files, one or more electronic documents, one or more electronic books, one or more textual media files, one or more computer program files, online content and binary data, one or more video recordings and one or more audio recordings.

Yet further features of the invention provides for the step of embedding key data in the restricted item to include one or more of the steps of: embedding the key data in the restricted item using digital watermarking, embedding the key data in the restricted item using analogue watermarking, embedding the key data in the restricted item as a one-dimensional or two-dimensional barcode, embedding the key data in the restricted item as a graphical code, embedding the key data in the restricted item using steganography, embedding the key data in the restricted item using natural language watermarking or natural language morphology, embedding the key data in the restricted item using hidden text or invisible text or binary data embedding, and embedding the key data in the restricted item using visible text or visible binary data embedding.

The invention extends to a system for monitoring third party access to a restricted item comprising:
- a restricted item receiving module configured to receive the restricted item;
- an embedding module, the embedding module being in communication with the restricted item receiving module and configured to embed key data in the restricted item, the key data being associated with a store of value and usable to conduct a transaction against the store of value, wherein a record of the transaction becomes visible in a transaction ledger;
- a monitoring module configured to monitor the transaction ledger to determine whether a transaction against the store of value has occurred; and
- a designation module in communication with the monitoring module and configured to designate the restricted item as accessed by a third party in the event that a transaction against the store of value has occurred.

Further features of the invention provide for the system to include a database configured to store the key data or data derived at least partially therefrom in association with an entity credential of an authorized entity, the authorized entity authorized to possess the restricted item; and for the system to be configured to perform the steps of: if the restricted item is designated as accessed by a third party, identifying the authorized entity as the responsible party to be held accountable for the third party access, and in response to determining that a transaction against the store of value has occurred, updating the database to indicate that the key data or data derived at least partially therefrom associated with the entity credential was used to conduct a transaction against the store of value.

Yet further features of the invention provide for the store of value to have a balance of digital currency; for the transaction ledger to be a shared public ledger containing records of transactions conducted using the digital currency; for the digital currency to be a cryptocurrency; for the store of value to be a cryptocurrency address; and for the cryptocurrency address to be represented by or derived at least partially from a cryptocurrency public key corresponding to a cryptocurrency private key.

Still further features of the invention provide for the key data to include the cryptocurrency private key or an address identifier derived at least partially from the cryptocurrency private key; for conducting a transaction against the store of value to include using at least the cryptocurrency private key to perform a cryptocurrency transaction; and for performing the cryptocurrency transaction to include transferring at least some of a balance of cryptocurrency held at the cryptocurrency address to a second, receiving cryptocurrency address represented by or derived at least partially from a second, receiving cryptocurrency public key.

A further feature of the invention provides for one or more of the cryptocurrency private key, the address identifier and the cryptocurrency public key to be associated with an authorized entity authorized to possess the restricted item and to be stored, in a database, in association with an entity credential of the authorized entity, wherein if the restricted item is designated as accessed by a third party, the authorized entity is identified as the responsible party to be held accountable for the third party access.

Further features of the invention provide for the key data to be readable from the restricted item by any third party that accesses the restricted item either directly or using a software tool; and for the step of embedding key data in the restricted item to include embedding a plurality of sets of key data in the restricted item.

Yet further features of the invention provide for the plurality of sets of key data to provide progressive levels of key data, wherein different software tools are required to access each of the progressive levels or to read the key data from each of the progressive levels; and for a software tool required to access a particular level of key data or to read the key data from the particular level to be made publicly available once it becomes known that techniques are available for removing the key data of a previous level from the restricted item.

Still further features of the invention provide for the cryptocurrency address to be controlled or managed by a party capable of monitoring the shared public ledger to determine whether a transaction against the store of value has occurred; and for the party controlling or managing the cryptocurrency address to be selected from the group consisting of: an individual having ownership or control of the restricted item, a group having ownership or control of the restricted item, an authorized entity authorized to possess the restricted item, a restricted item provider from which one or more authorized entity has requested the restricted item, and a third party associated with the restricted item provider.

Further features of the invention provide for the restricted item to be a media item; and for the media item to be a digital or analogue media item selected from the group consisting of: one or more video files, streaming media, one or more image files, one or more audio files, one or more electronic documents, one or more electronic books, one or more textual media files, one or more computer program files, online content and binary data, one or more video recordings and one or more audio recordings.

Yet further features of the invention provides for the step of embedding key data in the restricted item to include one or more of the steps of: embedding the key data in the restricted item using digital watermarking, embedding the key data in the restricted item using analogue watermarking, embedding the key data in the restricted item as a one-dimensional or two-dimensional barcode, embedding the key data in the restricted item as a graphical code, embedding the key data in the restricted item using steganography, embedding the key data in the restricted item using natural language watermarking or natural language morphology, embedding the key data in the restricted item using hidden text or invisible text or binary data embedding, and embedding the key data in the restricted item using visible text or visible binary data embedding.

The invention further extends to a computer program product for monitoring third party access to a restricted item, the computer program product comprising a non-transitory computer-readable medium having stored computer-readable program code, the computer-readable program code executable by a processing circuit to perform the steps of:
 embedding key data in the restricted item, the key data being associated with a store of value and usable to conduct a transaction against the store of value, wherein a record of the transaction becomes visible in a transaction ledger;
 monitoring the transaction ledger to determine whether a transaction against the store of value has occurred; and
 designating the restricted item as accessed by a third party in the event that a transaction against the store of value has occurred.

Further features of the invention provide for the computer-readable program code to be executable by the processing circuit to perform the further steps of: storing, in a database, the key data or data derived at least partially therefrom in association with an entity credential of an authorized entity, the authorized entity authorized to possess the restricted item; if the restricted item is designated as accessed by a third party, identifying the authorized entity as the responsible party to be held accountable for the third party access; and in response to determining that a transaction against the store of value has occurred, updating the database to indicate that the key data or data derived at least partially therefrom associated with the entity credential was used to conduct a transaction against the store of value.

Yet further features of the invention provide for the store of value to have a balance of digital currency; for the transaction ledger to be a shared public ledger containing records of transactions conducted using the digital currency; for the digital currency to be a cryptocurrency; for the store of value to be a cryptocurrency address; and for the cryptocurrency address to be represented by or derived at least partially from a cryptocurrency public key corresponding to a cryptocurrency private key.

Still further features of the invention provide for the key data to include the cryptocurrency private key or an address identifier derived at least partially from the cryptocurrency private key; for conducting a transaction against the store of value to include using at least the cryptocurrency private key to perform a cryptocurrency transaction; and for performing the cryptocurrency transaction to include transferring at least some of a balance of cryptocurrency held at the cryptocurrency address to a second, receiving cryptocurrency address represented by or derived at least partially from a second, receiving cryptocurrency public key.

A further feature of the invention provides for one or more of the cryptocurrency private key, the address identifier and the cryptocurrency public key to be associated with an authorized entity authorized to possess the restricted item and to be stored, in a database, in association with an entity credential of the authorized entity, wherein if the restricted item is designated as accessed by a third party, the authorized entity is identified as the responsible party to be held accountable for the third party access.

Further features of the invention provide for the key data to be readable from the restricted item by any third party that accesses the restricted item either directly or using a software tool; and for the step of embedding key data in the restricted item to include embedding a plurality of sets of key data in the restricted item.

Yet further features of the invention provide for the plurality of sets of key data to provide progressive levels of key data, wherein different software tools are required to access each of the progressive levels or to read the key data from each of the progressive levels; and for a software tool required to access a particular level of key data or to read the key data from the particular level to be made publicly available once it becomes known that techniques are available for removing the key data of a previous level from the restricted item.

Still further features of the invention provide for the cryptocurrency address to be controlled or managed by a party capable of monitoring the shared public ledger to determine whether a transaction against the store of value has occurred; and for the party controlling or managing the cryptocurrency address to be selected from the group consisting of: an individual having ownership or control of the restricted item, a group having ownership or control of the restricted item, an authorized entity authorized to possess the restricted item, a restricted item provider from which one or more authorized entity has requested the restricted item, and a third party associated with the restricted item provider.

Further features of the invention provide for the restricted item to be a media item; and for the media item to be a digital or analogue media item selected from the group consisting of: one or more video files, streaming media, one or more image files, one or more audio files, one or more electronic documents, one or more electronic books, one or more textual media files, one or more computer program files, online content and binary data, one or more video recordings and one or more audio recordings.

Yet further features of the invention provides for the step of embedding key data in the restricted item to include one or more of the steps of: embedding the key data in the restricted item using digital watermarking, embedding the key data in the restricted item using analogue watermarking, embedding the key data in the restricted item as a one-dimensional or two-dimensional barcode, embedding the key data in the restricted item as a graphical code, embedding the key data in the restricted item using steganography, embedding the key data in the restricted item using natural language watermarking or natural language morphology, embedding the key data in the restricted item using hidden text or invisible text or binary data embedding, and embedding the key data in the restricted item using visible text or visible binary data embedding.

In order for the invention to be more fully understood, implementations thereof will now be described with reference to the accompanying drawings.

DETAILED DESCRIPTION WITH REFERENCE TO THE DRAWINGS

Figure 1:
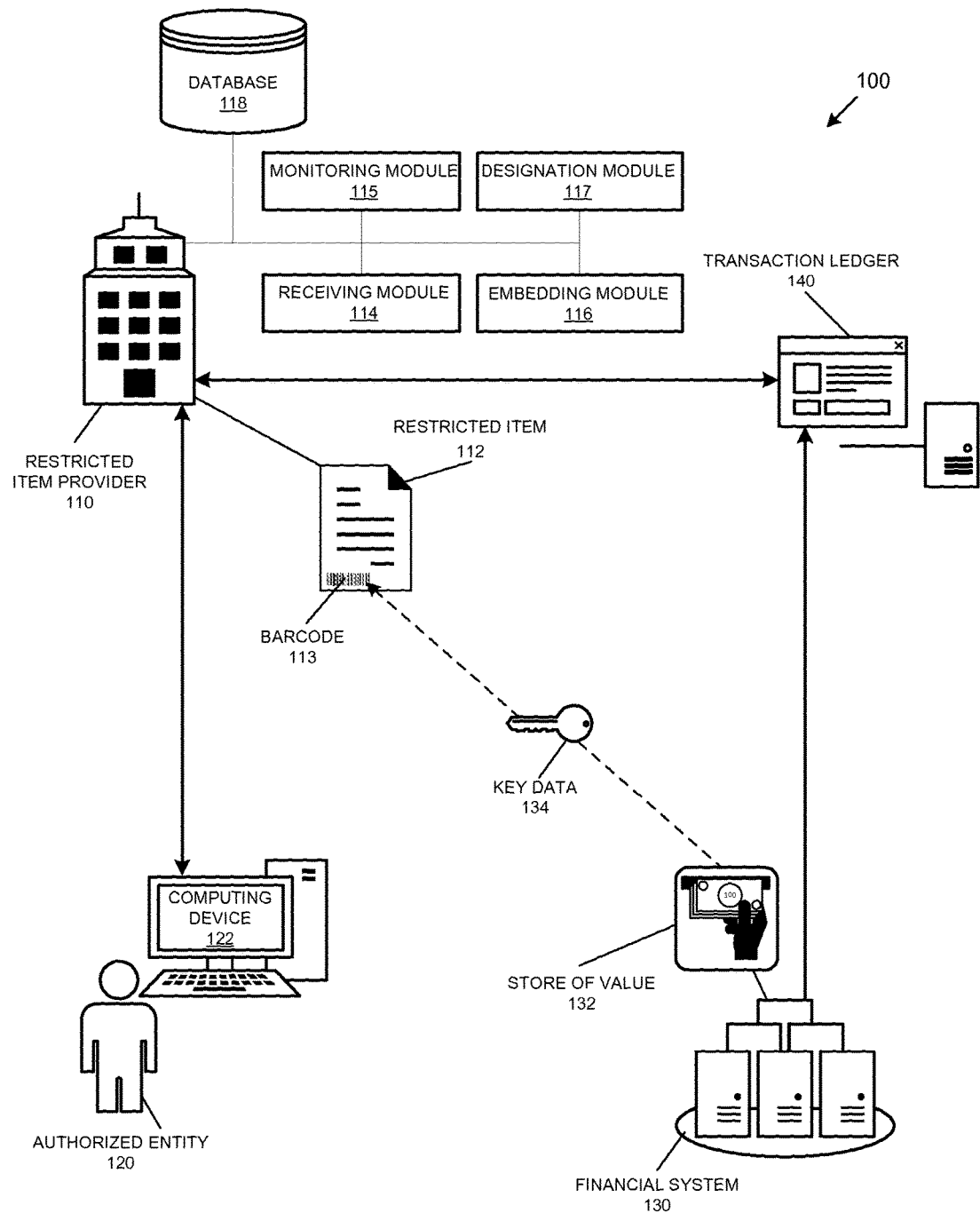
FIG. 1 is a schematic illustration a first embodiment of a system for monitoring third party access to a restricted item according to the invention.

A first embodiment of a system (100) for monitoring third party access to a restricted item according to the invention is illustrated in FIG. 1. The system (100) includes a restricted item provider (110), an authorized entity (120), and a financial system (130) providing at least one store of value (132).

The restricted item provider (110) possesses, controls or otherwise has access to a restricted item (112) which is to be made available to the authorized entity (120). In the embodiment of FIG. 1, and primarily for illustrative purposes, the restricted item (112) is a media item in the form of an e-book and the restricted item provider (110) is an online media content provider. Exemplary online media content providers include Amazon.com, Netflix, Hulu and the iTunes Store.

The authorized entity (120) has an electronic computing device (122), in this embodiment a desktop computer, by which it is able to communicate with the restricted item provider (110). Communications between the restricted item provider (110) and the electronic computing device (122) of the authorized entity (120) may be effected by way of any suitable wired or wireless communications channel. In this embodiment, the communications channel is the Internet.

The restricted item provider (110) has associated therewith a restricted item receiving module (114) configured to receive the restricted item (112) and an embedding module (116) in communication with the restricted item receiving module (114) configured to embed key data (134) in the restricted item (112). The key data (134) is associated with the store of value (132) and usable to conduct a transaction against the store of value (132), a record of such a transaction becoming visible in a transaction ledger (140).

The restricted item provider (110) further has associated therewith a monitoring module (115) configured to monitor the transaction ledger to determine whether a transaction against the store of value has occurred, and a designation module (117) in communication with the monitoring module (115) and configured to designate the restricted item (112) as accessed by a third party in the event that a transaction against the store of value has occurred.

A database (118) is operative in association with the restricted item provider (110). The database (118) is configured to store the key data (134) embedded in the restricted item (112) or data at least partially derived therefrom in association with an entity credential of the authorized entity (120) which is authorized to possess the restricted item (112).

Figure 2:
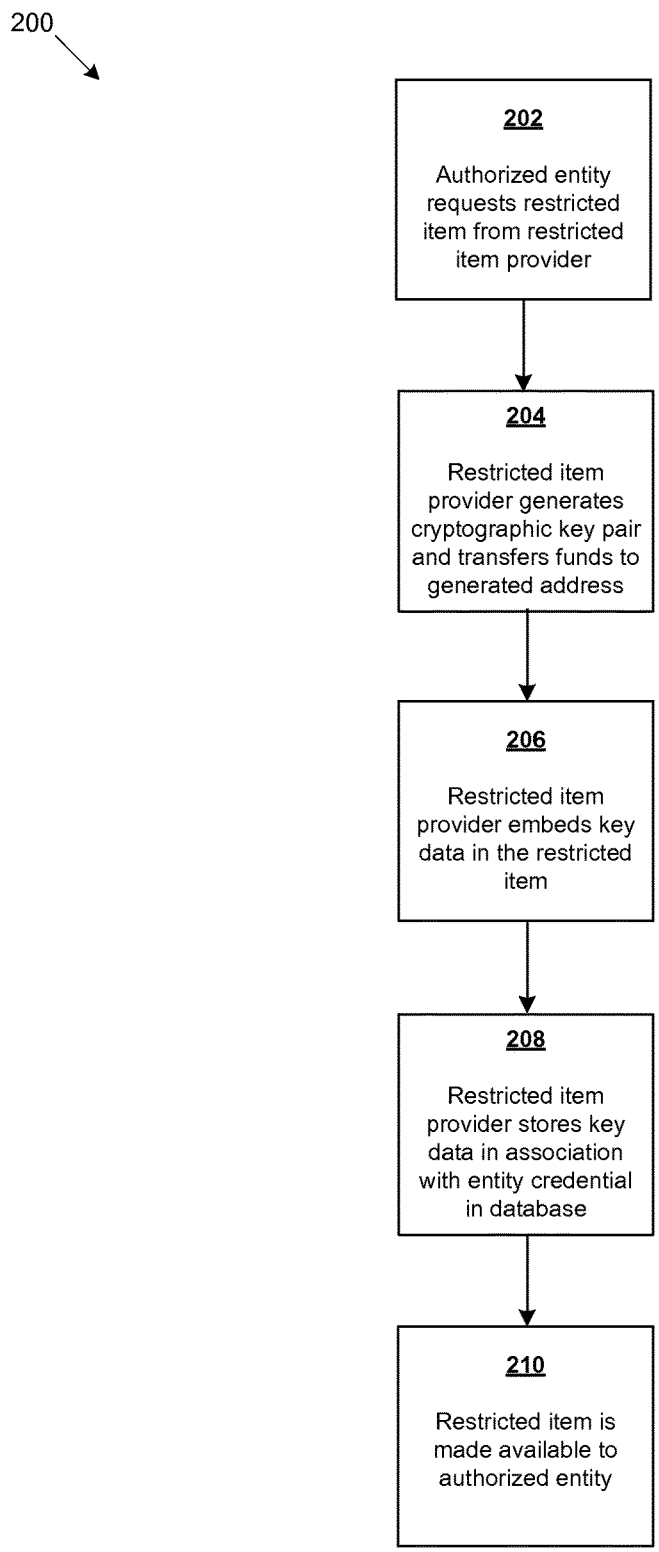
FIG. 2 is a block diagram illustrating a method of monitoring third party access to a restricted item according to the invention, using the system of FIG. 1.

The block diagram (200) of FIG. 2 illustrates a method of monitoring third party access to a restricted item according to the invention, using the system of FIG. 1.

At a first stage (202), the authorized entity (120) requests to obtain the restricted item (112) from the restricted item provider (110). For example, the entity (120) accesses a website of the restricted item provider (110) using the electronic computing device (122) and selects an e-book to purchase. The authorized entity (120) intends to permanently gain possession of the e-book in this embodiment.

The restricted item provider (110) desires to deter or prevent the authorized entity (120) from redistributing the restricted item (112) or reproductions thereof after it has been made available to the authorized entity (120). In the embodiment of FIG. 1, the key data (134) which is to be embedded in the restricted item (112) is an identifier uniquely associated with the store of value (132). The store of value (132) has a balance of digital currency. The financial system (130) of FIG. 1 is a system for digital currency in the form of a cryptocurrency. In this embodiment, the store of value (132) is a cryptocurrency address.

Cryptocurrencies allow digital currency to be transferred between cryptocurrency addresses without an intermediate financial institution or central authority. Exemplary cryptocurrency systems include peer-to-peer, decentralised cryptocurrencies such as Bitcoin, Litecoin and PPCoin.

In this embodiment, the cryptocurrency address (132) is represented by or derived from a cryptocurrency public key corresponding to a cryptocurrency private key. The public key is used and/or derived to obtain the cryptocurrency address (132), the address (132) having a specific balance of cryptocurrency held therein.

At a next stage (204), the restricted item provider (110) utilizes the cryptocurrency system described above and generates a cryptographic key pair, in other words, a private key and a public key associated with a cryptocurrency address (132). In this embodiment, the restricted item provider (110) generates the key pair and transfers funds to the cryptocurrency address (132).

The private key represents a direct monetary value which can be traded in the cryptocurrency system. In the case where the cryptocurrency is, for example, Bitcoin or another cryptocurrency system using a similar key and address scheme, the cryptocurrency address (132) has a particular balance associated therewith, indicated, for example, as 3.5 BTC or 0.0001 BTC in the case of Bitcoin.

At a next stage (206), the restricted item provider (110) embeds the key data in the restricted item (112) using the embedding module (116). In the embodiment of FIG. 1, the key data (134) is the private key associated with the cryptocurrency address (132).

The restricted item receiving module (114) typically receives the media item (112) before the private key (134) is embedded therein, from where it is transferred to the embedding module (116). In this embodiment, the private key (134) is embedded in the media item (112), which is an e-book in FIG. 1, as a one-dimensional barcode (113).

At a next stage (208), the restricted item provider (110) stores the private key (134) in association with an entity credential in the database (118), as described above. In this embodiment, the entity credential includes a name, address and contact details of the authorized entity (120). The database (118) therefore acts as a registry of keys, enabling the restricted item provider (110) to keep track of which private keys are associated with which authorized entity (120).

The restricted item (112) is then, at a next stage (210), made available to the authorized entity (120). In this embodiment, the authorized entity (120) may typically be able to download the e-book and store it locally or in any physical or cloud-based storage location as desired.

Records of all transactions conducted in the financial system (130) are held in the transaction ledger (140). In the embodiment of FIG. 1, the transaction ledger (140) is a publicly visible shared transaction ledger. Typically, the shared transaction ledger (140) includes all these transactions as a chain of transaction records or receipts, commonly referred to as a "block chain" in at least one known cryptocurrrency system. These transaction records are signed using both a private key and a public key, the private key being that of a party transferring value and the public key being associated with a receiving address. The shared transaction ledger (140) is typically publically accessible via a website or other Internet-based platform.

Transaction records are verified by third parties carrying out what is known as "mining blocks". Exemplary cryptocurrencies which make use of proof-of-work verification schemes, such as Secure Hash Algorithm 256 (SHA-256) or scrypt, are Bitcoin and Litecoin. An exemplary cryptocurrency system employing a combined proof-of-work/proof-of-stake verification scheme is PPCoin.

The principles and functioning of such cryptocurrencies having shared transaction ledgers containing transaction records will be well understood by those skilled in the art. Importantly, such a system allows a party having access to a private key or data at least partially derived therefrom to transact against a corresponding cryptocurrency address, in other words, either use the funds linked to the address or transfer the funds to a receiving address. These systems also allow any party to inspect or analyse the shared transaction ledger to determine whether a particular address was transacted against. In the embodiment of FIG. 1, the monitoring module (115) is used to inspect or analyse the shared transaction ledger (140), for example by using a web-based platform providing at least some of the transaction records, as illustrated in FIG. 1, whereby transaction records in the shared transaction ledger (140) can be accessed.

The authorized entity is therefore provided with a restricted item which has a reliable handle to a store of value embedded therein. Should the private key (134) not be read from the media item and used to transact against the cryptocurrency address, the funds stored therein remain untouched and the authorized entity either retains a deposit or token amount or is not held accountable and/or liable for unauthorized distribution.

However, if the restricted item (112) is distributed, leading to the private key (134) being read from the restricted item (112) and used to transact in the cryptocurrency system, some or all of the funds may become lost to one or both of the authorized entity (120) and the restricted item provider (110). Furthermore, the transaction is visible in the shared transaction ledger (140), making the possibly fraudulent activity immediately or relatively quickly traceable.

Figure 3:
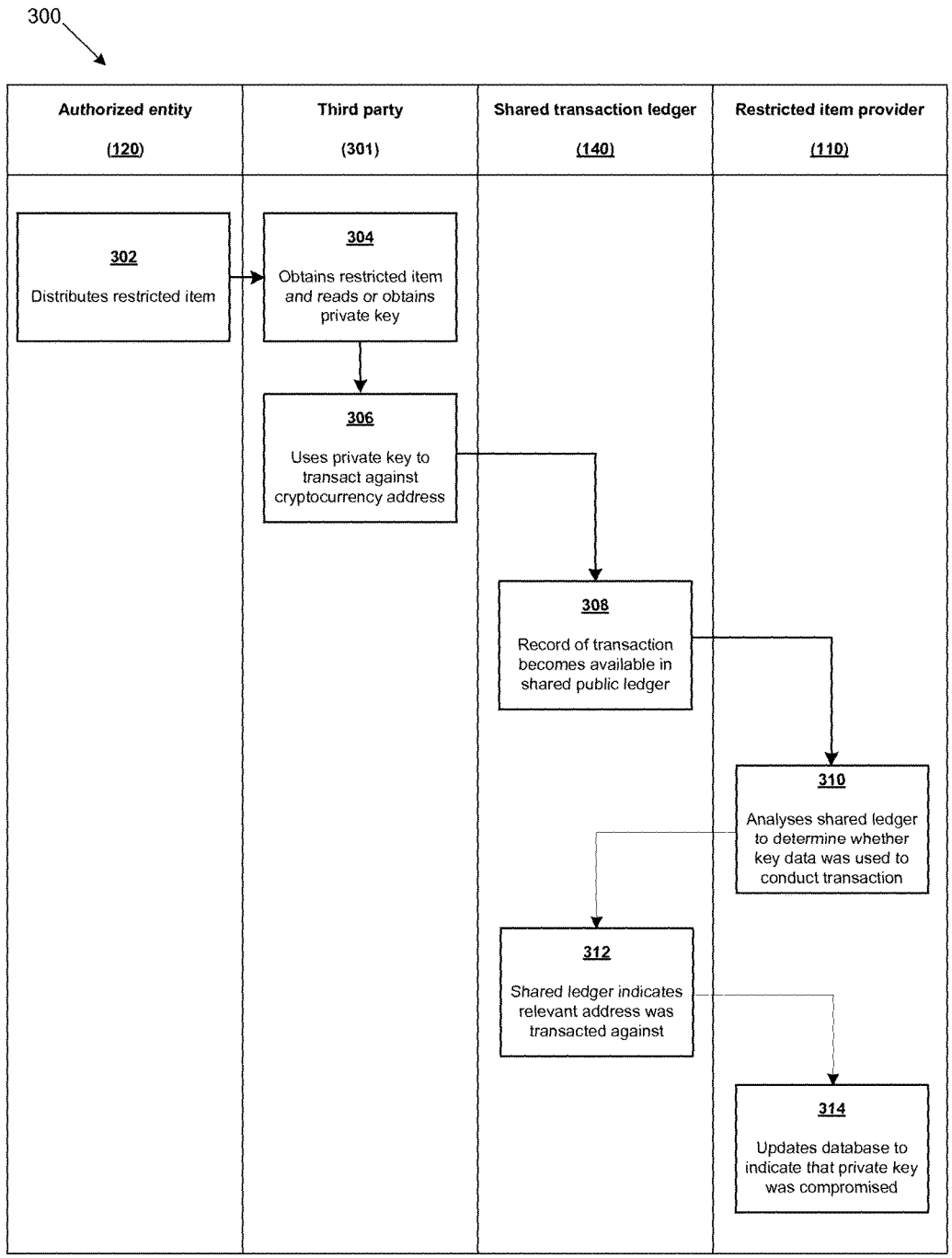
FIG. 3 is a swim-lane flow diagram illustrating a sequence of steps whereby an authorized entity to which a restricted item was made available may be identified according to the invention.

The flow diagram (300) of FIG. 3 illustrates a sequence of steps whereby an authorized entity to which a restricted item was made available may be identified according to the invention.

At a first stage (302), the authorized entity (120) distributes the restricted item (112) or allows the restricted item (112) to be distributed or accessed, either purposefully or negligently. At a next stage (304), a third party (301) obtains the restricted item (112) and reads the private key (134) from the media item (112). In the example of an e-book embedded with key data by way of a barcode described with reference to FIG. 1, the third party (301) may use a barcode-reading technique to obtain the private key (134) which is embedded in the e-book.

The private key may be readable from the restricted item by any third party that accesses the restricted item either directly or using a software tool. The software tool may, for example, be a publicly available software tool. This may incentivize third parties to obtain key data from unlawfully distributed restricted items and transact using the value associated with the cryptocurrency address.

The third party (301) then, at a next stage (306), utilizes the cryptocurrency system to move funds from the cryptocurrency address (132) corresponding to the private key (134) to a desired address, or spends all or some of the funds in any other way.

Use of the private key (134), which serves as or may be derived from the key data uniquely associating the authorized entity (120) with the restricted item (112), may typically include use of the private key (134) and a receiving public key to conduct a cryptocurrency transaction against the cryptocurrency address (132) in favour of a receiving cryptocurrency address. Such a transaction may involve transferring at least some of a balance of cryptocurrency held at the cryptocurrency address (132) to a second, receiving cryptocurrency address represented by or derived at least partially from a second, receiving cryptocurrency public key.

After the third party (301) has conducted the above transaction, at a next stage (308), a record of the transaction becomes visible in the shared transaction ledger (140) or "block chain". The restricted item provider (110) or any other party fulfilling this function analyses the shared transaction ledger (140) at a next stage (310) to determine whether the private key (134) was used to conduct a transaction. In this case, due to the transaction conducted by the third party (301), the shared transaction ledger (140) indicates, at a next stage (312), that the cryptocurrency address (132) was transacted against and therefore that the private key (134) was compromised.

The restricted item provider (110), at a final stage (314), in response to determining that a transaction was conducted against the store of value using the identifier which was embedded in the restricted item (112), updates the database (118) to indicate that the identifier was used to transact against the value store, in other words, that the private key (134) was compromised. This prompts the restricted item provider (110) or other party managing the monitoring of the shared transaction ledger (140) to designate the restricted item (112) as accessed by a third party.

The transaction record in the shared transaction ledger (140) may be used by the restricted item provider (110), or, of course, by any entity or agent monitoring the shared transaction ledger (140) on behalf of the restricted item provider (110), to extract, obtain or derive the private key (134), public key or simply the cryptocurrency address. The obtained information is matched with the key data stored in the database (118) in association with the entity credential. In this way, the authorized entity (120) may be unambiguously identified and the restricted item provider (110) is able to determine that the private key (134) was in some way compromised.

Various situations or courses of action may ensue after the private key (134) is compromised as described above, depending on the functioning of the cryptocurrency address (132) and ownership of the funds therein. In a first example, if the value held at the address (132) was a deposit put down by the authorized entity (120), the entity (120) suffers financial loss. In a second example, if the value held at the address (132) was funds provided by the restricted item provider (112), the entity (120) may be held liable for the financial loss of the restricted item provider (110).

Importantly, the authorized entity (120) may be held accountable or liable for unlicensed or unauthorized distribution of the media item (112), since the shared public ledger (140) contains proof that the private key (134) was compromised.

The monetary or digital currency value associated with the cryptocurrency address may function in a variety of ways. In the embodiment of FIG. 1, these funds represent a token amount not intended to be spent, unless the private key is compromised and spent by a third party (typically used in the case of a permanent transfer of a physical, biological or media item).

Alternatively, the funds may represent a deposit paid by the authorized entity that may be forfeited if the authorized entity distributes the restricted item to a third party. The funds may also be funds entrusted to the authorized entity by the restricted item provider, and for which the authorized entity is held accountable and/or liable if the private key is compromised and the funds spent or transferred. It should be appreciated that any combination of the above functions or further suitable functions may be employed.

The above description of the first embodiment of a system for monitoring third party access to a restricted item and methods for putting the system to use according to the invention is done by way of example only and it should be appreciated that numerous changes and modifications may be made to the embodiments described without departing from the scope of the invention.

It should be noted that, throughout the entirety of this specification, wherever the terms "private key", "key data", "public key", "cryptocurrency address", or the like is used, the term may, of course, refer to any derivation thereof that can be used to reliably obtain the identifier or data signified by the term used. Such a derivation of the private key, for example a cryptographic hash thereof, may therefore be embedded in the restricted item. Importantly, the key data embedded in the restricted item includes the cryptocurrency private key or an address identifier derived at least partially from the cryptocurrency private key. For example, the address identifier may be a link, a tool or any other identifier usable to obtain or access the private key.

Throughout the entirety of this specification, the term "database" should be interpreted so as to have its broadest meaning, and includes any data storage means whereby a credential of an entity can be reliably stored in association with key data or derivatives thereof.

The restricted item provider may, for example, be any media item or content provider or any digital or analogue media distributor. For example, the restricted item provider may be a satellite television service provider, a broadcasting corporation, a physical music or video distributor, an author, a photographer, a composer, an artist, a software provider or a publisher.

The restricted item provider may, in one scenario, be the author, creator or producer of the restricted item, for example, in the case that the restricted item provider is an artist. The restricted item provider may, in a different scenario, be a distributor, retailer, or commercial restricted item provider, for example, in the case that the restricted item provider is a software provider.

The restricted item provider may be any other suitable entity in cases where the restricted item is not a media item. For example, the restricted item provider may be a plant breeder, developer or researcher in cases where the restricted item is a biological or genetic item.

The restricted item is not restricted to a media item and may be any item capable of being embedded with any form of data for the purpose of monitoring third party access to the restricted item. The restricted item may be a physical item such as a book, a compact disc, a physical document, or a work of art, an electronic item such as digital media, a biological item such as a genetic sequence or biological matter, or any other item capable of being embedded with data.

Particularly, the restricted item may be a digital media item or analogue media item. In cases where the media item is in a digital form, it may be, among many others, one or more video files, one or more audio files, one or more electronic document files, one or more electronic books, one or more textual media files, one or more computer program files, computer gaming files or data, streaming media, and one or more image files. In cases where the media item is in analogue form, it may, for example, be one or more video recordings or one or more audio recordings. The media item may be textual media such as hypertexts, multimedia, digital art, e-mail, and the like.

The electronic computing device is not limited to a desktop or personal computer and may be any other communications device with substantially similar communications abilities, such as a mobile phone, a tablet computer or a laptop computer.

Communications between the restricted item provider and the electronic computing device of the authorized entity may, in alternative embodiments, be effected by way of a voice call or a mobile software platform used to request the restricted item from the restricted item provider.

In further embodiments, the authorized entity may communicate with the restricted item provider without using electronic communications means. For example, the authorized entity may physically request and/or receive the restricted item from the restricted item provider, such as by way of a postal or courier service, or through over-the-counter sale or delivery.

The authorized entity may be any suitable entity, living or non-living, which is to receive the restricted item from the restricted item provider. For example, the authorized entity may be a consumer, institution, group, organization, electronic platform, or database receiving the restricted item from the restricted item provider. It should be appreciated that the same restricted item or copies or derivatives thereof may be provided to a plurality of authorized entities in further embodiments of the invention. Furthermore, the authorized entity may be an original owner, author or creator of the restricted item or may otherwise have rights in respect of the restricted item.

The entity credential may be any suitable information serving to identify the authorized entity, for example, one or more of a name, an address, an e-mail address, a financial account number, a media service membership identifier, an identity number, contact details such as an a telephonic contact number, a physical address, employer information, details of a financial account and media service subscription information.

The key data may be any data or information capable of being used directly or indirectly to conduct a transaction against the store of value, either in the form in which it is embedded in the restricted item or a form derived therefrom.

The key data may be stored in the database such that, when the key data embedded in the restricted item or data derived therefrom is subsequently obtained by the restricted item provider from a source other than the database, it is able to match the key data with the entity credential in the database in order to unambiguously identify the authorized entity. Typically, the key data is subsequently obtained from a record of a transaction against the store of value from which the key data can be extracted or derived.

The key data may be embedded in the restricted item using any suitable information embedding technique, depending of course on the restricted item type. In embodiments of the invention, the key data is embedded using one or more of the following techniques: embedding the key data in the restricted item using digital watermarking, embedding the key data in the restricted item using analogue watermarking, embedding the key data in the restricted item as a one-dimensional or two-dimensional barcode, embedding the key data in the restricted item as a graphical code, embedding the key data in the restricted item using steganography, embedding the key data in the restricted item using natural language watermarking or natural language morphology, embedding the key data in the restricted item using hidden text or invisible text or binary data embedding, and embedding the key data in the restricted item using visible text or visible binary data embedding. In some embodiments, the restricted item is a biological or genetic item and the key data is embedded, for example, in a genetic sequence.

A further example of an embedding technique is natural language watermarking or natural language morphology, whereby, for example, sentence construction of a document may be watermarked. In one example, the structure of one or more sentence constituents in a natural language text may be used to insert a watermark into a document.

Preferably, the key data is embedded using a robust technique, which makes it relatively easy to read or derive the private key, while completely removing, obscuring or obliterating the key data from the restricted item is made comparatively difficult. In some embodiments, removing the key data from the restricted item destroys the item, makes the value associated with the cryptocurrency address unusable, materially alters the item's content or makes it subsequently unusable.

The scope of the invention thus extends to any suitable information embedding technique. For example, the private key may simply be included in plaintext form in an electronic document or video, included in audio format in an audio or video file, or printed in a physical document.

It should also be appreciated that more than one set of key data, in other words, more than one private key or derivation thereof, may be embedded in a single restricted item. Furthermore, the same set of key data may be embedded in multiple restricted items. An example of such a case is a scenario wherein the authorized entity has an account at an online media library, such as iTunes. Any media item purchased or obtained using the account may then be embedded with the same key data or sets of key data, such that distribution of any or all of these media items may be unambiguously traced back to the authorized entity and/or the account.

In cases where more than one different private key is embedded in the restricted item, each private key corresponds to a separate cryptocurrency address having a balance of cryptocurrency. Alternatively, a single private key embedded in the restricted item may be associated with a plurality of cryptocurrency addresses in the database, the authorized entity typically being held liable for funds held in one or more of the plurality of addresses.

It is foreseen that the restricted item provider may have management software used for any one or more of the following functions: to receive the restricted item using the restricted item receiving module, to generate the necessary cryptographic key pairs, to store keys in association with entity credentials, to embed private keys in restricted items using the embedding module, to distribute or otherwise allow entities to obtain requested items, to monitor the shared transaction ledger using the monitoring module, and to use the designation module to designate a restricted item as accessed by a third party in the event that a transaction against a particular cryptocurrency address becomes visible in the shared transaction ledger. Designating a restricted item as accessed by a third party may refer to any action taken an entity to confirm or establish that the key data embedded in the restricted item was compromised and used to transact against the relevant cryptocurrency address.

The cryptocurrency address may be controlled and/or managed by any party capable of monitoring the transaction ledger to determine whether a transaction against the store of value has occurred. The party may typically be an individual having ownership or control of the restricted item, a group having ownership or control of the restricted item, the authorized entity itself, the restricted item provider as described above, or a third party associated with the restricted item provider.

It should specifically be noted that the cryptocurrency address may be controlled and/or managed by a third party embedding service provider. In such cases, one or more of the restricted item receiving module, the embedding module, the monitoring module, the designation module and the database may be associated with the embedding service provider such that the embedding service provider is capable of embedding the key data in the restricted item on behalf of the restricted item provider and performing one or more of the further functions associated with the modules mentioned and the database.

The restricted item may be embedded with the key data by the embedding service provider on behalf of the authorized entity. In such cases, embedding the restricted item with the identifier and/or the managing of cryptocurrency addresses and keys are outsourced to and carried out by an external service provider.

It should be appreciated that the entity controlling and/or managing the cryptocurrency address may elect to change the balance of cryptocurrency stored at the cryptocurrency address by conducting transactions against the address to increase or decrease its value. Such action may be taken, for example, in response to the restricted item becoming compromised or to create a reward or incentive for finding the restricted item and/or the key data embedded therein.

It should be appreciated that the restricted item may have various formats and is not limited to the transfer of a file or document. In one example, the authorized entity may select media content to stream or video content to download to a personal device.

In addition to the use of a cryptocurrency system, any suitable conventional payment systems and channels may be employed to purchase, rent or otherwise transact to obtain the restricted item. Alternatively, no conventional payment may be required.

In the embodiment of FIG. 1, the cryptocurrency address is controlled and managed by the restricted item provider. The restricted item provider then generates the key pair and transfers funds to the cryptocurrency address.

Alternatively, the cryptocurrency address may be associated with a key pair of the authorized entity, the authorized entity providing the restricted item provider with the private key to enable the restricted item provider to uniquely identify transactions conducted against the cryptocurrency address. The authorized entity may have generated the key pair, provides the private key to the restricted item provider, and the restricted item provider transfers funds to the cryptocurrency address. In a further embodiment, the authorized entity, after generating the cryptocurrency address and transferring funds to the cryptocurrency address, provides the private key to the restricted item provider.

In an exemplary cryptocurrency system, Bitcoin, the cryptocurrency address is a 160-bit hash of the public portion of a public/private Elliptic Curve Digital Signature Algorithm (ECDSA) keypair. In at least one known cryptocurrency system, the cryptocurrency address is therefore algorithmically converted from a public key. However, it should be appreciated that the cryptocurrency address may be the public key itself, or any other identifier derived at least partially from the public key. The cryptocurrency address and public key may thus comprise different values or strings of characters that are uniquely associated with each other such that the private key remains unambiguously linked to the cryptocurrency address. The invention is not limited to one or more particular cryptocurrency systems, as will be apparent to those skilled in the art.

In embodiments of the invention, the balance associated with the crytocurrency address may be less than an inherent value of the restricted item.

The restricted item may be made available to the authorized entity permanently, as is the case in the example of FIG. 1. This may typically be the case for physical or biological items or media items such as, among others, music files, software and electronic books. If the restricted item is made available to the authorized entity permanently, the authorized entity may be held liable for unauthorized distribution of the restricted item at any time after the restricted item is made available to the authorized entity.

Alternatively, the restricted item may be made available for a predefined period of time or until a predefined condition is met. For example, the restricted item may be streaming media, in which case the authorized entity is only held liable for compromising the private key embedded in the media during a specific timeframe, for example, until streaming has ended. A predefined condition which lifts accountability and/or liability from the authorized entity may be returning of the restricted item to the restricted item provider. Alternatively, the restricted item provider may monitor the shared transaction ledger for a period of time to determine whether the cryptocurrency address is transacted against before liability is lifted. Alternatively, the authorized entity may be held indefinitely liable.

In one particular example, the restricted item may be a digital media item in the form of a film provided to an individual or group for the purpose of viewing the film and returning the digital media item after a predefined period of time without distributing the item to any external party. In such a case, the digital media item may be embedded with key data associated with a cryptocurrency address having a value of, for example, $1,000.00 or $50,000.00, such that these funds may be spent if the item is distributed to external parties. The embedded key data may then serve as a deposit, which is returned to the individual or group upon the restricted item provider being satisfied that an uncompromised digital media item has been returned.

Figure 4:
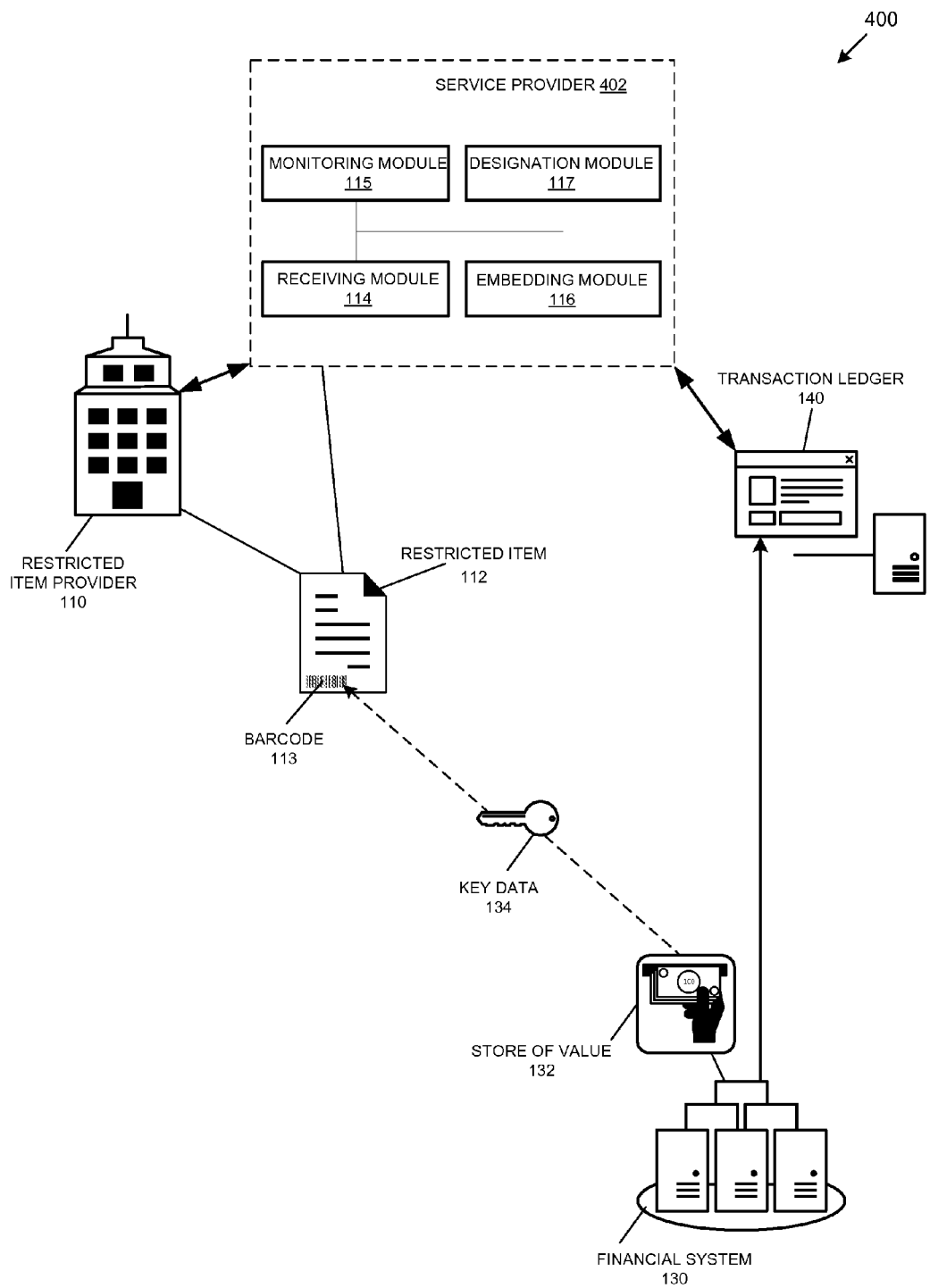
FIG. 4 is a schematic illustration of a second embodiment of a system for monitoring third party access to a restricted item according to the invention.

The system (400) of FIG. 4 is a second embodiment of a system for monitoring third party access to a restricted item according to the invention. The system (400) is similar to the system (100) of FIG. 1, and like reference numerals represent like components, entities, systems or devices.

In this embodiment, the restricted item provider (110) does not provide the restricted item (112) to a specific authorized entity. Furthermore, the key data embedded in the restricted item (112) is not stored in association with a particular entity such that the specific entity may be held accountable or liable for distributing the restricted item (112).

The embodiment of FIG. 4 further includes a third party service provider (402), the service provider (402) responsible for operating the restricted item receiving module (114), the embedding module (116), the monitoring module (115) and the designation module (117) in a manner similar to the manner described above. It should be appreciated that any one or more of the modules may be managed by the restricted item provider (110) instead.

The system configuration shown in FIG. 4 may enable the restricted item provider (110) to become aware that the restricted item (112) has been used, distributed or otherwise operated without authorization, without requiring the restricted item provider (110) to associate the restricted item (112) with one or more specific authorized entities.

This may be desirable in cases where the restricted item (112) is made available by the restricted item provider (110) to only a few individuals, for example. Also, in certain scenarios, the restricted item provider (110) may not desire to know the identity of the infringer, but simply that the restricted item (112) has been placed "in the clear" or "in the wild", where it can, for example, be uncontrollably distributed.

Figure 5:
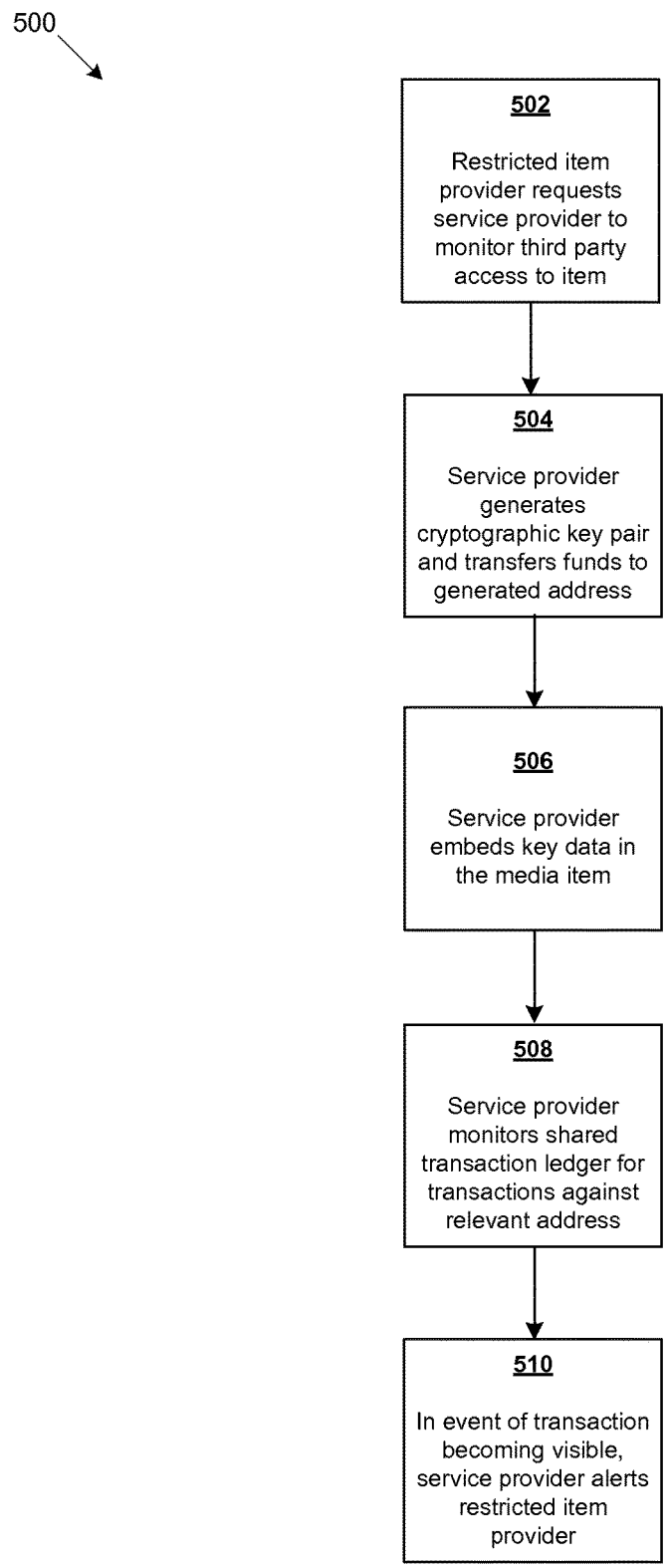
FIG. 5 is a block diagram illustrating a method of monitoring third party access to a restricted item according to the invention, using the system of FIG. 4.

The block diagram (500) of FIG. 5 illustrates a method of monitoring third party access to a restricted item according to the invention, using the system of FIG. 4.

At a first stage (502), the restricted item provider (110) requests the third party service provider (402) to monitor third party access to the restricted item (112). The service provider (402), at a next stage (504), generates a cryptographic key pair and transfers funds to a generated cryptocurrency address (132). The service provider (402) then proceeds to embed key data in the restricted item (112) as described above, at a following stage (506).

The service provider (402) monitors the shared transaction ledger (140) for transactions against the relevant address (132) at a next stage (508), and, in the event of a transaction becoming visible, alerts the restricted item provider (110), at a final stage (510), that the key data has been compromised and the value stored at the cryptocurrency address (132) transacted against.

It may be advantageous for the restricted item provider (110) to become aware that the restricted item (112) has been compromised for several reasons. For example, the restricted item provider (110) may be a software provider such as an anti-virus provider which may desire to update software once it is known that a certain restricted item is in the clear. In a further example, the restricted item provider (110) may desire to adapt its security measures to disallow access to software, online platforms or user accounts to users once it is known that a restricted item is in the clear.

Figure 6:
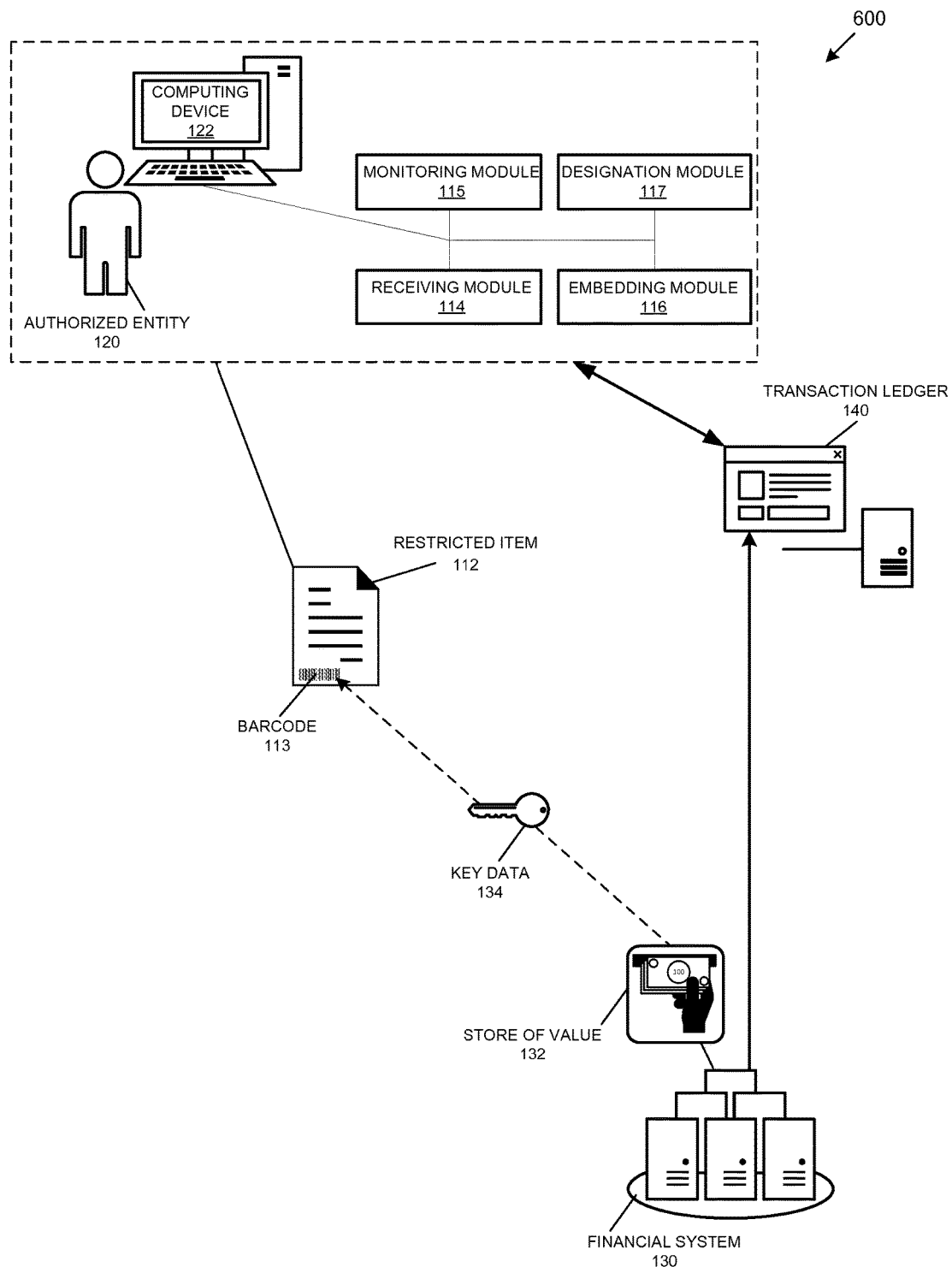
FIG. 6 is a schematic illustration of a third embodiment of a system for monitoring third party access to a restricted item according to the invention.

The system (600) of FIG. 6 is a third embodiment of a system for monitoring third party access to a restricted item according to the invention. The system (600) is similar to the systems (100, 400) of FIGS. 1 and 4, and like reference numerals represent like components, entities, systems or devices.

In this embodiment, the authorized entity (120) does not receive the restricted item (112) from an item provider. Instead, the authorized entity (120) desires to monitor third party access to a restricted item it already owns or controls. For example, the authorized entity (120) may be a composer aiming to become aware once musical works stored on the electronic computing device (122) of the composer have been compromised.

In a further example, the authorized entity (120) may be an individual aiming to protect personal data such as bank account or credit card information. In such a case, the authorized entity (120) may embed key data in a document containing the personal data such that upon determining, from the shared transaction ledger (140), that a transaction has been conducted using the key data, it can be deduced that the personal data has been compromised. The authorized entity (120) may then take appropriate action to guard against losses, for example, by freezing relevant financial accounts.

In the embodiment of FIG. 6, the electronic computing device (122) of the authorized entity (120) may be utilized to operate the restricted item receiving module (114), the embedding module (116), the monitoring module (115) and the designation module (117) in a manner similar to the manner described above. Importantly, in embodiments of the invention, it is the authorized entity (120), in other words a legitimate user or controller of an item, which may be responsible for embedding key data in the item to, for example, protect the integrity of the item.

Figure 7:
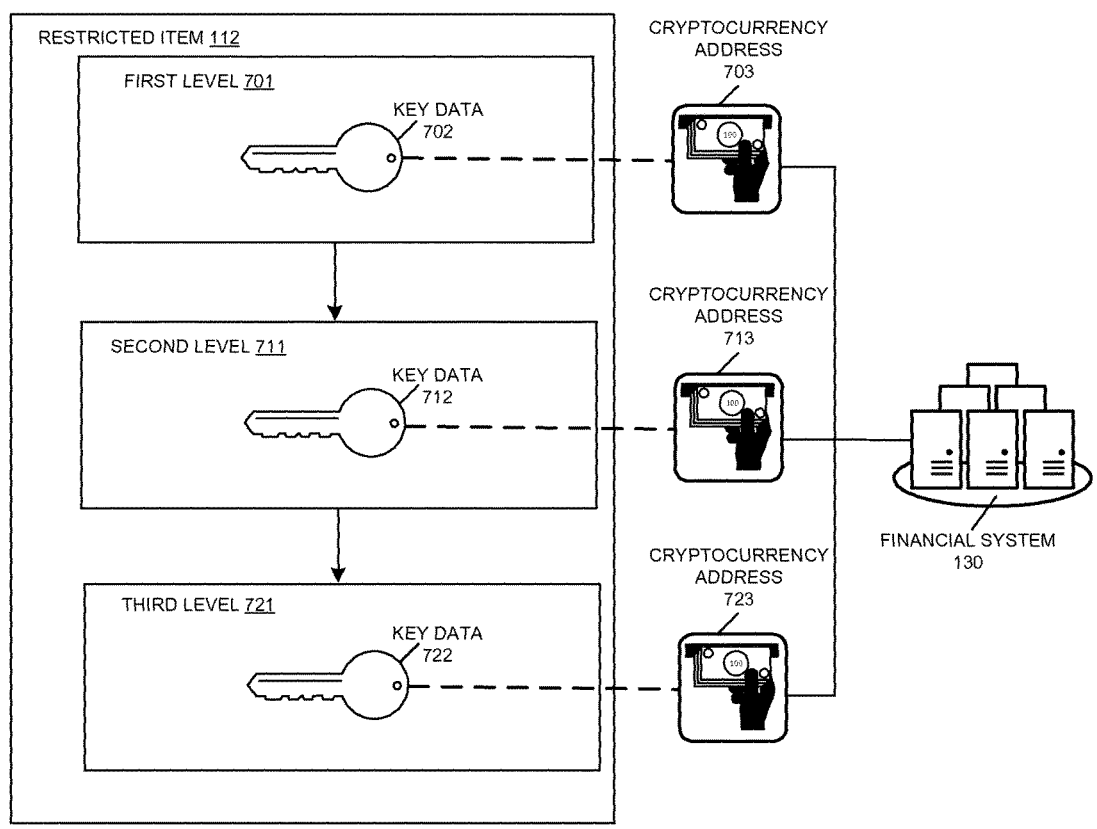
FIG. 7 is a schematic illustration of a restricted item provided with progressive levels of key data according to embodiments of the invention.

As described above, in embodiments of the invention, more than one set of key data, in other words, more than one private key or derivation thereof, may be embedded in a single restricted item. FIG. 7 shows a schematic illustration of a restricted item (112) provided with progressive levels (701, 711, 721) of key data (702, 712, 722) according to embodiments of the invention. In FIG. 7, reference numerals corresponding to reference numerals in FIGS. 1 to 6 represent like entities, components or devices.

As illustrated in FIG. 7, multiple sets of key data (702, 712, 722) may be embedded in a single restricted item (112). Each of the sets (702, 712, 722) represent or is associated with a private key corresponding to a public key, which in turn represents or is associated with a cryptocurrency address (703, 713, 723) usable to transact against in the cryptocurrency financial system (130).

In embodiments of the invention, the plurality of sets of key data (702, 712, 722) provides progressive levels (701, 711, 721) of key data, wherein different software tools are required to access each of the progressive levels or to read the key data from each of the progressive levels. Any suitable software tool may be used which enables the user thereof to access the level and/or read the key data from the particular level. For example, the software tool may be browser add-on that checks downloaded files for key data.

Furthermore, a software tool required to access a particular level of key data or to read the key data from the particular level may only be made publicly available once it becomes known that techniques are available for removing the key data of a previous level from the restricted item.

Figure 8:
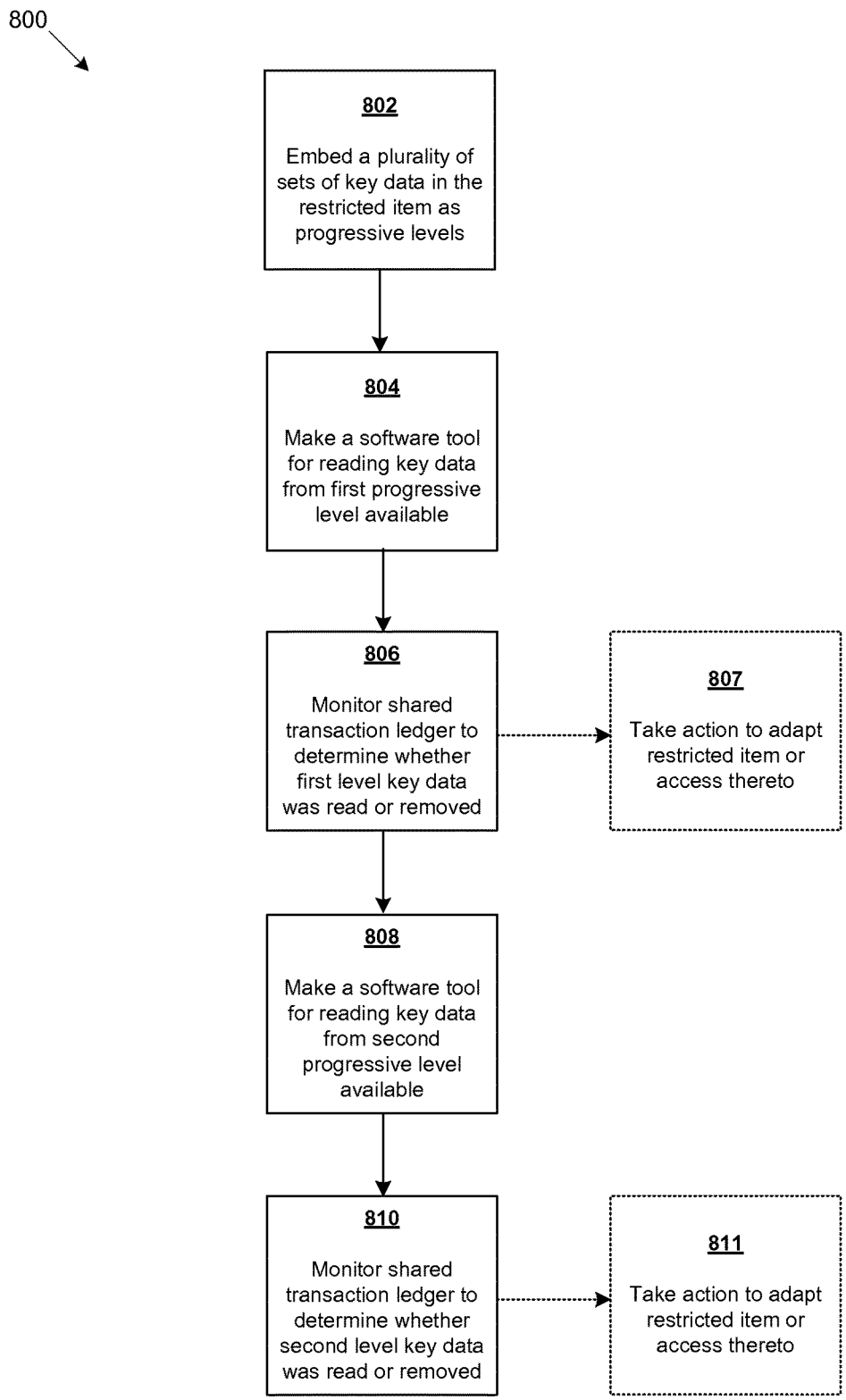
FIG. 8 is a block diagram illustrating a method of monitoring third party access to a restricted item according to the invention, wherein the restricted item is provided with progressive levels of key data.

The block diagram (800) of FIG. 8 illustrates a method of monitoring third party access to a restricted item according to the invention, using progressive levels of key data as described with reference to FIG. 7.

At a first stage (802), a plurality of sets of key data are embedded in the restricted item, using any of the methods or techniques described above. For example, three sets of key data (702, 712, 722) are embedded in a restricted item (112) such as a computer program file, thereby creating three progressive levels (701, 711, 721) of key data.

At a next stage (804), a software tool may be made available, for example, by making the tool downloadable from a website, which is to be used for reading key data (702) from the first progressive level (701). The tool may typically be made available by an entity responsible for the restricted item (112) and controlling or managing the associated cryptocurrency addresses (703, 713, 723).

The entity then, at a next stage (806), monitors the shared transaction ledger and/or sources where the restricted item may be found to determine whether the first level key data (702) was removed and used to conduct a transaction. In the event that the entity does determine that a third party has transacted against the address (703), the entity may, at a next stage (807), wish to take action to adapt the restricted item or access thereto. For example, once a software provider has determined that it has become possible to remove the key data from at least one progressive level from the restricted item before distributing it, it may wish to update or "patch" software to such an extent that an original restricted item which has come "in the clear" is no longer usable without the updated software.

At a next stage (808), a software tool is made available to be used for reading the key data (712) from the second progressive level (711). The entity then, at a further stage (810), again monitors the shared transaction ledger and/or sources where the restricted item may be found to determine whether the second level key data (712) was removed and used to conduct a transaction. Once again, the entity may, at a following stage (811) take desired action. Similar steps may be followed to monitor third party access to the restricted item (112) in respect of the third progressive level (721).

It should be appreciated that any suitable method may be used to determine whether key data has been removed from a restricted item in such cases. Where it is suspected that a set of key data has been removed from a restricted item containing more than one set of key data, an entity may search for the restricted item by searching for a particular set of key data, for example, in a search engine, to check whether there are items containing only some of the sets of key data, but being devoid of at least one set.

Embedding multiple sets of key data may enhance the ability of a restricted item provider or authorized entity to monitor third party access to the restricted item. Also, embedding multiple sets of key data in the restricted item may also serve as a deterrent, as it may be the case that even though an entity has removed a first set of key data from the restricted item to obviate the risk of other parties using the key data to transact, the entity may still be aware of the risk that one or more further sets of key data may still be embedded in the restricted item.

The scope of the invention extends to a computer program product for monitoring third party access to a restricted item. Such a computer program product may typically comprise a non-transitory computer-readable medium having stored computer-readable program code, the computer-readable program code executable by a processing circuit to perform any one or more of the steps described with reference to FIGS. 1 to 8.

The steps described may include but are not limited to embedding key data in the restricted item, the key data being associated with a store of value and usable to conduct a transaction against the store of value and wherein a record of the transaction becomes visible in a transaction ledger, monitoring the transaction ledger to determine whether a transaction against the store of value has occurred, and designating the restricted item as accessed by a third party in the event that a transaction against the store of value has occurred.

In embodiments of the invention, and as the case may be in any one or more of the systems and methods described with reference to FIGS. 1 to 8, the computer-readable program code may be executable by the processing circuit to further perform one or more of the steps of: storing, in a database, the key data or data derived at least partially therefrom in association with an entity credential of an authorized entity, the authorized entity authorized to possess the restricted item, if the restricted item is designated as accessed by a third party, identifying the authorized entity as the responsible party to be held accountable for the third party access, and in response to determining that a transaction against the store of value has occurred, updating the database to indicate that the key data or data derived at least partially therefrom associated with the entity credential was used to conduct a transaction against the store of value.

The above description of embodiments of the invention is by way of example only and it should be appreciated that numerous changes and modifications may further be made to the embodiments described without departing from the scope of the invention.

It should specifically be appreciated that the restricted item provider may be any suitable person or entity. For example, the restricted item provider may be an artist desiring to deter unauthorized distribution of a creative work in which media rights of the artist subsists. The artist may then embed an identifier in the media item as described above. Alternatively, the artist may use the services of a third party embedding service provider, as described above, to embed an identifier in the media and/or manage any number of identifiers, addresses and/or keys on behalf of the artist.

Although the identifier is a private key or derivatives thereof in embodiments of the invention described herein, the identifier may be any identifying code, image, string, reference, audio, video, or the like, which is usable to identify a source of funds which can be transacted against using information embedded in the restricted item or derivatives thereof. The key data may therefore simply be usable as a handle to one or both of the private key or a source of funds or value.

A system and method for monitoring third party access to a restricted item is thus provided. In embodiments of the invention, digital currency is essentially embedded in a restricted item by making a private key of a cryptocurrency address readable or derivable from the media item. In this way, the system and method of the present invention may allow a relevant party to immediately or relatively quickly become aware that a restricted item has been distributed, copied, sold or the like.

This may enable owners or controllers of restricted items to react quickly to such activities, for example, by releasing updated software or "patches", by making changes to software or media to make the restricted items subsequently unusable, or the like.

In cases where the restricted item was provided to a specific entity or entities, immediate penalty or punishment may be imposed on those distributing the restricted items without authorization.

The direct monetary value attached to a particular set of key data may incentivize or motivate a third party to conduct a transaction using compromised key data. For example, the third party may typically wish to harvest the value associated with the key data.

This may be effected by imposing direct cost or liability on the infringing entity if the embedded funds are compromised. A transaction conducted using a compromised private key immediately becomes visible in the shared transaction ledger, which shows that the embedded key data has been used to transact with funds linked therewith. This may obviate the need to perform a lengthy and/or expensive search in an attempt to find an infringing entity, and enable a restricted item provider to rapidly react to unlicensed distribution. The embedded key data may further be used to uniquely identify an infringing restricted item or both the item and an infringing entity in places where compromised items are typically found, such as on file-sharing websites or in physical, copied media items.

The system and method may further be advantageous in that it can be implemented at a relatively low cost, by substantially using, for example, existing cryptocurrency platforms.

In cases where the restricted items are media items, the system and method may aid in deterring individuals and entities from unlawfully or without authorization distributing analogue or digital media. By embedding digital currency, particularly the private key of a cryptocurrency, into the media itself, the risk arises that the embedded funds are lost and the activity traced if the media is distributed by the consumer. The system and method described may similarly aid in deterring or punishing individuals in cases where the restricted item is, for example, a biological or genetic item to which certain parties have exclusive or partially exclusive rights.

Finally, the present invention may lead to an improved experience for legitimate consumers of media items. For example, by allowing a user to fairly use a media item while ensuring that the media item is not distributed to third parties who may read and transact on embedded private keys, implementation of the system and method provided may obviate the need to place restrictions on, among other things, moving media from one device to another device or editing formats of certain media items.

We claim:

1. A computer-implemented method of monitoring third party access to a restricted item, the method including the steps of:

identifying, by a computing device, a publically visible transaction ledger, accessible via a website or other Internet-based platform, in which records of transactions conducted against cryptocurrency addresses, each of which having a balance of digital currency, become visible, the records being signed using a private key of a party transferring value and a public key associated with a receiving cryptocurrency address;

identifying, by the computing device, a restricted item having embedded key data, wherein the key data is unique to the restricted item and to a particular cryptocurrency address and includes a private key or an address identifier derived at least partially from the private key, the key data usable to conduct a transaction with the particular cryptocurrency address;

storing, by the computing device, the key data or data derived at least partially therefrom in a database;

monitoring, by the computing device, the publically visible transaction ledger by extracting or otherwise obtaining information including one or more of private keys, public keys or cryptocurrency addresses from transaction records in the publically visible transaction ledger;

determining, by the computing device, that a transaction against the particular cryptocurrency address has occurred by matching the extracted or otherwise obtained information with the key data stored in the database; and designating, by the computing device, the restricted item as accessed by a third party when the transaction against the particular cryptocurrency address has occurred.

2. A method as claimed in claim 1, wherein the key data or data derived at least partially therefrom is stored in the database in association with an entity credential of an authorized entity, the authorized entity being authorized to possess the restricted item, and wherein the method includes the step of:

if the restricted item is designated as accessed by the third party, identifying, by the computing device, the authorized entity as a responsible party to be held accountable for the third party access.

3. A method as claimed in claim 2 further including the step of:

in response to determining that the transaction against the particular cryptocurrency address has occurred, updating, by the computing device, the database to indicate that the key data or data derived at least partially therefrom associated with the entity credential was used to conduct the transaction against the particular cryptocurrency address.

4. A method as claimed in claim 1, wherein the transaction ledger is a shared public ledger containing records of transactions conducted using the digital currency.

5. A method as claimed in claim 4, wherein the digital currency is a cryptocurrency.

6. A method as claimed in claim 1, wherein the cryptocurrency address is represented by or derived at least partially from a cryptocurrency public key corresponding to a cryptocurrency private key.

7. A method as claimed in claim 6, wherein the key data includes the cryptocurrency private key or wherein the address identifier is derived at least partially from the cryptocurrency private key.

8. A method as claimed in claim 7, wherein conducting a transaction against the particular cryptocurrency address includes using at least the cryptocurrency private key to perform a cryptocurrency transaction.

9. A method as claimed in claim 8, wherein performing the cryptocurrency transaction includes transferring at least some of a balance of cryptocurrency held at the particular cryptocurrency address to a second, receiving cryptocurrency address represented by or derived at least partially from a second, receiving cryptocurrency public key.

10. A method as claimed in claim 7, wherein one or more of the cryptocurrency private key, the address identifier and the cryptocurrency public key is associated with an authorized entity authorized to possess the restricted item and is stored, in the database, in association with an entity credential of the authorized entity, wherein if the restricted item is designated as accessed by a third party, the authorized entity is identified as the responsible party to be held accountable for the third party access.

11. A method as claimed in claim 1, wherein the key data is readable from the restricted item by any third party that accesses the restricted item either directly or using a software tool.

12. A method as claimed in claim 1, wherein a plurality of sets of key data are embedded in the restricted item.

13. A method as claimed in claim 12, wherein the plurality of sets of key data provide progressive levels of key data, wherein different software tools are required to access each of the progressive levels so as to read the key data from each of the progressive levels.

14. A method as claimed in claim 13, wherein a software tool required to access a particular level of key data so as to read the key data from the particular level is made publicly available once it becomes known that techniques are available for removing the key data of a previous level from the restricted item.

15. A method as claimed in claim 8, wherein the particular cryptocurrency address is controlled or managed by a party capable of monitoring the shared public ledger to determine whether a transaction against the particular cryptocurrency address has occurred.

16. A method as claimed in claim 15, wherein the party controlling or managing the particular cryptocurrency address is selected from the group consisting of: an individual having ownership or control of the restricted item, a group having ownership or control of the restricted item, an authorized entity authorized to possess the restricted item, a restricted item provider from which one or more authorized entity has requested the restricted item, and a third party associated with a restricted item provider.

17. A method as claimed in claim 1, wherein the restricted item is a media item.

18. A method as claimed in claim 17, wherein the media item is a digital or analogue media item selected from the group consisting of: one or more video files, streaming media, one or more image files, one or more audio files, one or more electronic documents, one or more electronic books, one or more textual media files, one or more computer program files, online content and binary data, one or more video recordings and one or more audio recordings.

19. A method as claimed in claim 1, further comprising embedding the key data in the restricted item including one or more of the steps of: embedding the key data in the restricted item using digital watermarking, embedding the key data in the restricted item using analogue watermarking, embedding the key data in the restricted item as a one-dimensional or two-dimensional barcode, embedding the key data in the restricted item as a graphical code, embedding the key data in the restricted item using steganography, embedding the key data in the restricted item using natural language watermarking or natural language morphology, embedding the key data in the restricted item using hidden text or invisible text or binary data embedding, and embedding the key data in the restricted item using visible text or visible binary data embedding.

20. A system for monitoring third party access to a restricted item, the system including at least one processing circuit and a computer-readable non-transitory medium coupled to the processing circuit, the computer-readable medium comprising code executable by the processing circuit for implementing a method comprising:

receiving the restricted item;

identifying a publically visible transaction ledger, accessible via a website or other Internet-based platform, in which records of transactions conducted against cryptocurrency addresses, each of which having a balance of digital currency, become visible, the records being signed using a private key of a party transferring value and a public key associated with a receiving cryptocurrency address;

embedding key data in the restricted item, wherein the key data is unique to the restricted item and to a particular cryptocurrency address and includes a private key or an address identifier derived at least partially from the private key, the key data usable to conduct a transaction with the particular cryptocurrency address;

storing the key data or data derived at least partially therefrom in a database;

monitoring the publically visible transaction ledger by extracting or otherwise obtaining information including one or more of private keys, public keys or cryptocurrency addresses from transaction records in the transaction ledger;

determining that a transaction against the particular cryptocurrency address has occurred by matching the extracted or otherwise obtained information with the key data stored in the database; and designating the restricted item as accessed by a third party when the transaction against the particular cryptocurrency address has occurred.

21. A system as claimed in claim 20, further comprising the database, the database being configured to store the key data or data derived at least partially therefrom in association with an entity credential of an authorized entity, the authorized entity being authorized to possess the restricted item and wherein the method further includes the steps of:

if the restricted item is designated as accessed by the third party, identifying the authorized entity as the responsible party to be held accountable for the third party access; and in response to determining that the transaction against the particular cryptocurrency address has occurred, updating the database to indicate that the key data or data derived at least partially therefrom associated with the entity credential was used to conduct the transaction against the particular cryptocurrency address.

22. A computer program product for monitoring third party access to a restricted item, the computer program product comprising a non-transitory computer-readable medium having stored computer-readable program code, the computer-readable program code executable by a processing circuit to perform the steps of:

identifying a publically visible transaction ledger, accessible via a website or other Internet-based platform, in which records of transactions conducted against cryptocurrency addresses, each of which having a balance of digital currency, become visible, the records being signed using a private key of a party transferring value and a public key associated with a receiving cryptocurrency address;

identifying a restricted item having embedded key data, wherein the key data is unique to the restricted item and to a particular cryptocurrency address and includes a private key or an address identifier derived at least partially from the private key, the key data usable to conduct a transaction with the particular cryptocurrency address;

storing the key data or data derived at least partially therefrom in a database;

monitoring the publically visible transaction ledger by extracting or otherwise obtaining information including one or more of private keys, public keys or cryptocurrency addresses from transaction records in the publically visible transaction ledger;

determining that a transaction against the particular cryptocurrency address has occurred by matching the extracted or otherwise obtained information with the key data stored in the database; and designating, by a computing device, the restricted item as accessed by a third party when the transaction against the particular cryptocurrency address has occurred.

23. A computer program product as claimed in claim 22, wherein the key data or data derived at least partially therefrom is stored in the database in association with an entity credential of an authorized entity, the authorized entity being authorized to possess the restricted item, and wherein the computer-readable program code is executable by the processing circuit to perform the further steps of:

if the restricted item is designated as accessed by the third party, identifying the authorized entity as the responsible party to be held accountable for the third party access; and in response to determining that the transaction against the particular cryptocurrency address has occurred, updating the database to indicate that the key data or data derived at least partially therefrom associated with the entity credential was used to conduct the transaction against the particular cryptocurrency address.

* * * * *